United States Patent [19]

Yasuda et al.

[11] Patent Number: 5,629,586
[45] Date of Patent: May 13, 1997

[54] COMPACT FLUORESCENT LAMP UNIT HAVING FIRST AND SECOND SEALED END PORTIONS SEPARATED BY A SUPPORT MEMBER

[75] Inventors: Takeo Yasuda; Kenichi Asami, both of Kanagawa-ken, Japan

[73] Assignee: Toshiba Lighting and Technology Corporation, Tokyo, Japan

[21] Appl. No.: 496,697

[22] Filed: Jun. 29, 1995

[30] Foreign Application Priority Data

Jun. 30, 1994 [JP] Japan .................... 6-150281
Mar. 31, 1995 [JP] Japan .................... 7-076531

[51] Int. Cl.[6] .................... H05B 37/00; H01J 1/00
[52] U.S. Cl. .................... 315/46; 315/58; 315/71; 313/344
[58] Field of Search .................... 315/46, 58, 71, 315/245, 241 R, 244, 56; 313/341, 344, 315

[56] References Cited

U.S. PATENT DOCUMENTS

| | | | |
|---|---|---|---|
| 4,311,942 | 1/1982 | Skeist et al. | 315/62 |
| 4,647,820 | 3/1987 | Chermin et al. | 315/245 |
| 4,686,412 | 8/1987 | Johnson | 313/344 |
| 4,871,944 | 10/1989 | Skwirut et al. | 315/56 |

*Primary Examiner*—Robert Pascal
*Assistant Examiner*—David Vu
*Attorney, Agent, or Firm*—Cushman Darby & Cushman, IP Group of Pillsbury Madison & Sutro, LLP

[57] ABSTRACT

A compact fluorescent lamp unit has a phosphor coated bulb of which first and second sealed end portions. A pair of filaments is disposed in the bulb. The filament contains an emitter for enhancing thermionic emission of electrons therefrom and is caused to be cut off by the self-generated heat when the emitter is substantially dissipated. The lamp device has an inverter circuit containing a resonant capacitor disposed between each one end of the filament coils to pass a resonant current through the capacitor during the operation of the lamp. The filament coil is substantially composed of a tungsten wire having a diameter corresponding to 8 MG though 12 MG and is normally operated with a lamp current ranging from 250 mA to 350 mA. The filament coil has a cold resistance ranging from 2 Ω to 4 Ω and an output voltage of the inverter circuit exhibits more than 260 volts when the fluorescent lamp is substituted by a resistor having 5 Ω.

8 Claims, 4 Drawing Sheets

COMPACT FLUORESCENT LAMP UNIT HAVING FIRST AND SECOND SEALED END PORTIONS SEPARATED BY A SUPPORT MEMBER

BACKGROUND OF THE INVENTION

1. Field of the Invention

The present invention relates to a compact fluorescent lamp unit that is adapted for use as a direct replacement for an incandescent type lamp in a lighting fixture.

2. Description of the Related Art

A compact fluorescent lamp unit is widely used for residential and commercial illumination. In Japanese patent document (kokai) 61-168856(1985) a compact fluorescent lamp unit of this type is disclosed. The compact fluorescent lamp unit has a saddle shaped glass bulb which contains a pair of filament coils disposed in each bulb end. The filament coil contains an emitter for enhancing thermionic emission. The lamp unit also has a lighting circuit which is enclosed in a plastic housing, together with the bulb. A threaded member is fitted on a base portion of the housing for permitting the lamp unit to be operated with on an AC power source. Inside the housing, a space is provided for the bulb and the lighting circuit. A support member for supporting both bulb ends is disposed in the space.

When the emitter of the filament coils is dissipated at the end of the life time of the lamp unit, it abnormally raises temperature of the filament coil. Excessive heat deteriorates the support member holding the lamp bulb ends which may lead to fumming or fire for the worst case.

SUMMARY OF THE INVENTION

The object of the present invention to provide an improved compact fluorescent lamp unit, which prevents a lamp end support member from being heat-deteriorated.

To achieve the above object, the compact fluorescent lamp unit has a phosphor coated bulb including first and second sealed end portions, a pair of filament coils each disposed in the first and second sealed end portions for producing an arc therebetween, and a fill containing mercury and a rare gas. The filament coil which has two ends contains an emitter for enhancing thermionic emission of electrons therefrom. The filament coil is cut off by the self-generated heat when the emitter is substantially dissipated. The lamp unit also has a lighting circuit arrangement for supplying electrical energy to the filament coils, which has an inverter circuit containing a resonant capacitor being connected between each one end of the filament coils so as to pass a resonant current through the capacitor during the operation of the lamp. A housing which provides a space therein encloses the bulb and the lighting circuit arrangement. In the space a support member is disposed for supporting the first and second sealed end portions of the bulb.

The filament coil is substantially composed of a tungsten wire having a diameter corresponding to 8 MG through 12 MG and is normally operated with a lamp current ranging from 250 mA to 350 mA.

The filament coil has a cold resistance ranging from 2 Ω to 4 Ω, and an output voltage of the inverter circuit exhibits more than 260 volts when the fluorescent lamp is substituted by a resistor having 5 Ω.

The compact fluorescent lamp unit has a partition member for dividing the space into first and second space portions wherein the bulb is substantially contained in the first space portion while the lighting circuit arrangement is contained in the second space portion. The partition member may include the support member.

BRIEF DESCRIPTION OF THE DRAWINGS

The accompanying drawings, which constitute a part of the specification, illustrate a presently preferred embodiment of the invention, and together with the general description given above and the detailed description of the preferred embodiment given below, serve to explain the principles of the present invention.

DETAILED DESCRIPTION OF THE PREFERRED EMBODIMENT

Referring now to the accompanying drawings, an embodiment of the invention is described.

Figure 1:
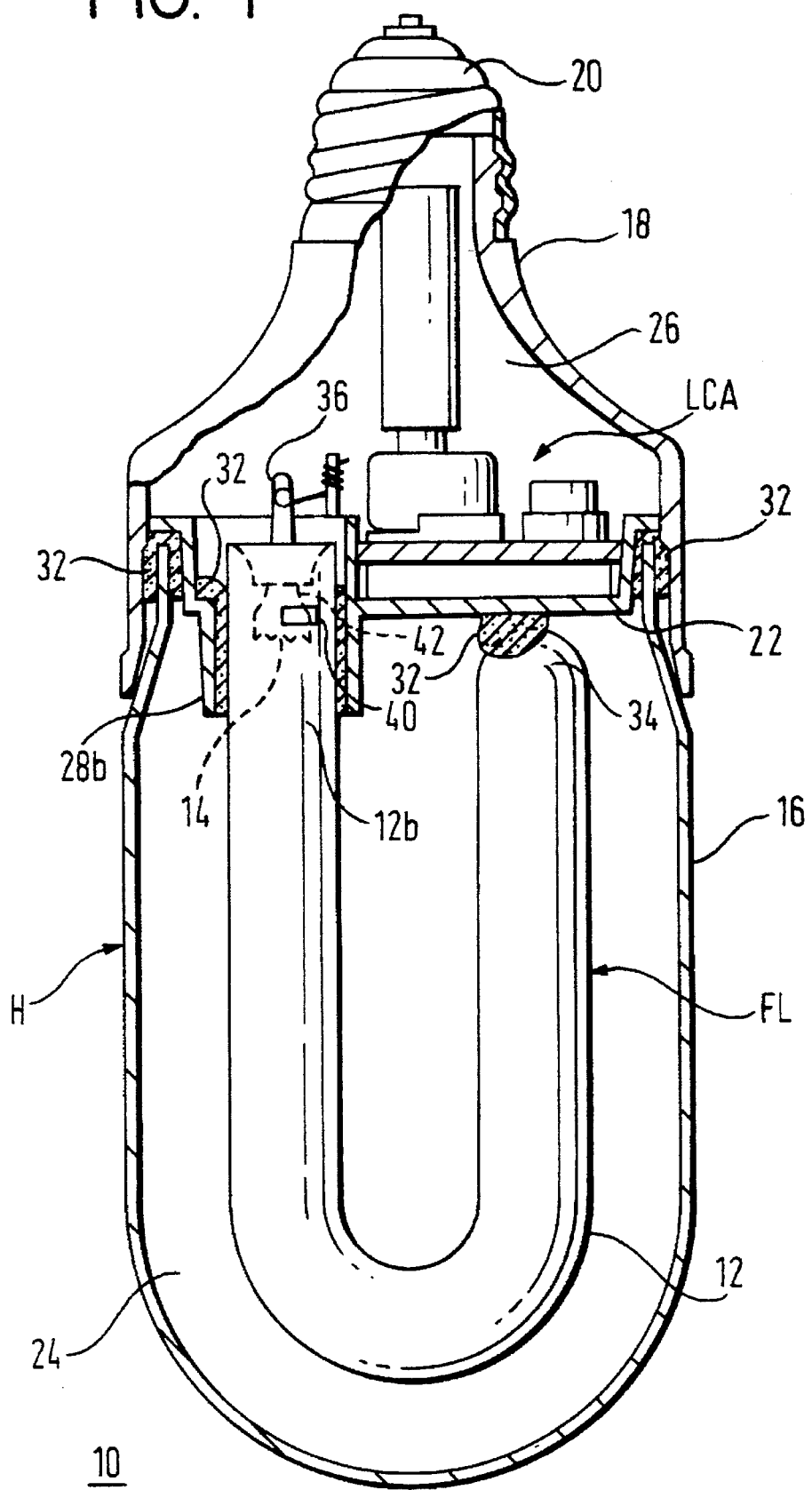
FIG. 1 is a front view, partly in section, of a compact fluorescent lamp unit in accordance with the present invention.
Figure 2:
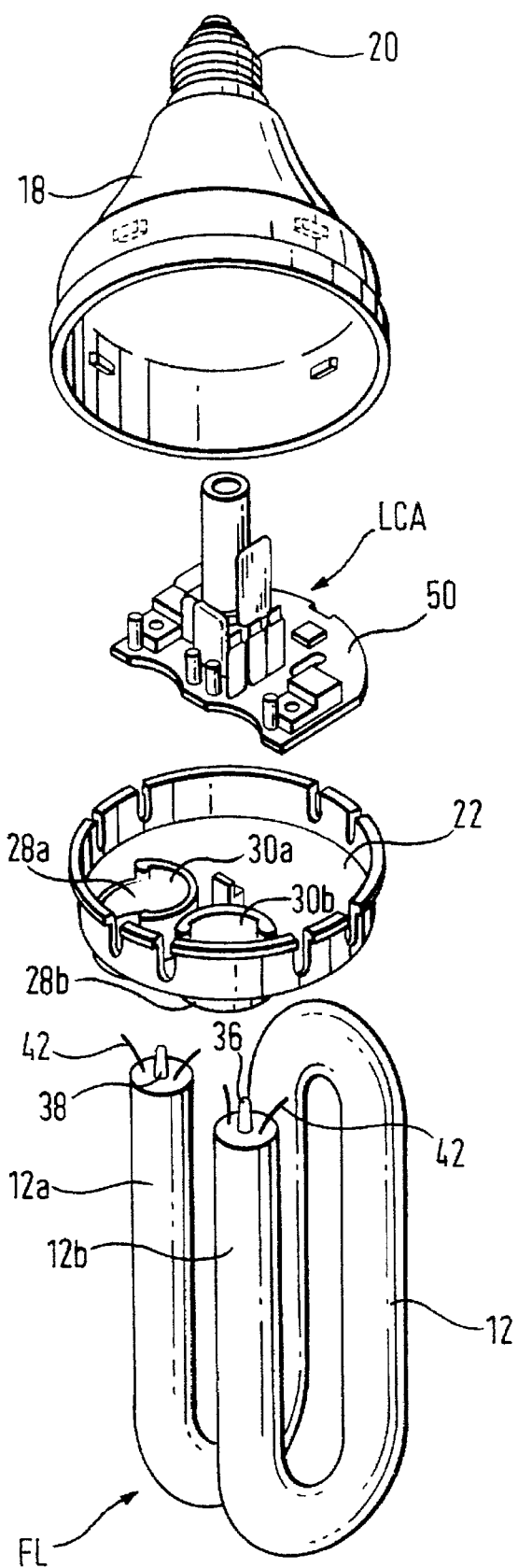
FIG. 2 is an exploded view in perspective of the lamp unit (a housing is not shown)

A compact fluorescent lamp unit 10 embodying the invention is shown in FIG. 1. The fluorescent lamp unit 10 has a fluorescent lamp FL, a housing H and a lighting circuit arrangement LCA for the fluorescent lamp FL. The fluorescent lamp FL has a tubular glass bulb 12 formed into a triple U-bent shape or a saddle shape. A pair of electrodes or filament coils 14,14 is disposed in leg portions 12a, 12b of the bulb 12. Fabrication of the fluorescent lamp FL is not unique to those skilled in the art, therefor the detailed explanations on the fluorescent lamp FL is not needed. The housing H is composed of a globe 16 and a base member 18 including a thread base 20 adapted for a conventional incandescent lamp socket such as Edison type E26 socket. A partition plate member 22 is disposed in a space of the housing H, which divides the space into first and second spaces 24, 26. As shown in FIG. 1, the fluorescent lamp FL is contained in the first space 24 while the lighting circuit arrangement LCA is contained in the second space 26. The lighting circuit arrangement LCA has an inverter circuit INV for generating a high frequency output for the fluorescent lamp FL and is assembled on a PC board 50.

The partition plate member 22 is formed with a heat resistive plastic such as PBT resin, which has two cylindrical sleeves 28a, 28b for supporting leg portions 12a, 12b of the bulb 12. Each of the cylindrical sleeves 12a, 12b defines circular apertures 30a, 30b, respectively. Each of the leg portions 12a, 12b is inserted into the apertures 30a 30b, respectively. A thermosetting adhesive 32 containing silicone is employed to fix the leg portions 12a, 12b to the sleeves 28a,28b in the apertures 30a, 30b and to hold a round top 34 of the bulb 12. The globe 16 and the base member 18 are connected each other with aid of the adhesive 32, the hardness of the adhesive 32 being selected in a range of 20 through 50.

Similar to conventional fluorescent lamps, the fluorescent lamp FL has a phosphor layer (not shown) formed on the inner wall, mercury and a rare gas such as argon. Reference numeral 36, 38 denote exhaust tubes extending from each end of the leg portions 12a, 12b. Mercury is dozed in the bulb 12 in the form of amalgam. The amalgam consisting of Bi-In-Pb-Hg is placed in the exhaust tube 36. Suitable compositions of the amalgam are as follows:

EXAMPLE 1

47.0 wt %≦Bi≦59.0 wt %, 1.5 wt %≦In≦4.5 wt %, 35.0 wt %≦Pb≦47.0 wt %, 2.5 wt %≦Hg≦6.0 wt %

EXAMPLE 2

50.6 wt %≦Bi≦52.6 wt %, 2.6 wt %≦In≦3.2 wt %, 39.5 wt %≦Pb≦41.5 wt %, 3.6 wt %≦Hg≦4.4 wt %

A nickel plate 40 on which surface indium is vapor-deposited is welded to a lead-in wire 42 of the filament coil 14. Indium on the nickel plate 40 absorbs mercury and forms an amalgam of In-Hg which is referred to an auxiliary amalgam.

Figure 3:
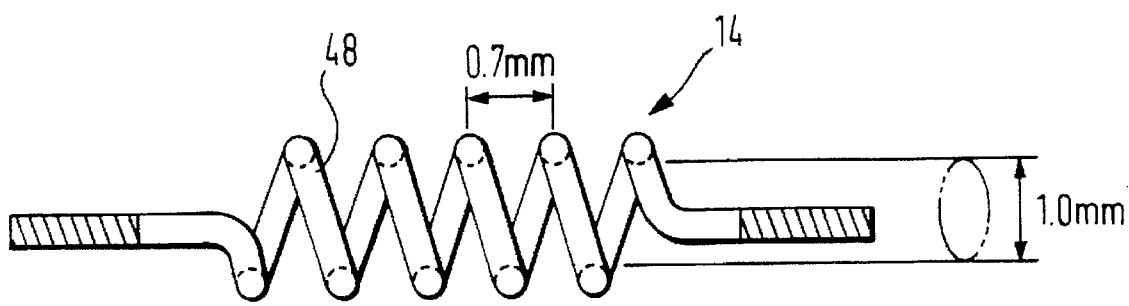
FIG. 3 is an enlarged view of a coil filament used in the lamp unit.
Figure 4:
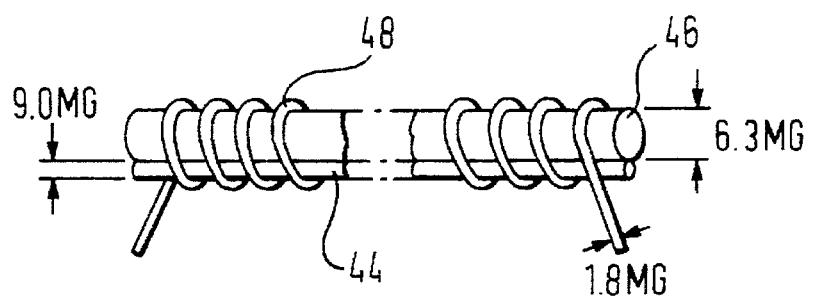
FIG. 4 and FIG. 5 are pictorial views of the coiling steps of the coil filament shown in FIG. 3.

FIG. 3 shows the filament coil 14 for the fluorescent lamp FL. The filament coil 14 contains electron emission material know as an emitter (not shown). In forming the filament coil 14, one may start with a permanent primary tungsten wire 44 along which is laid a temporary mandrel or filler wire 45 of molybdenum as shown in FIG. 4. The wires 44, 46 together form the composite primary mandrel around which a relatively fine tungsten wire 48 is wrapped to form the overwind. The wires 44, 46 correspond to sizes used in a 13.5 watt fluorescent lamp (lamp current 280 mA) wherein the overwind 48 is 1.8 MG, the permanent wire 44 is 9.0 MG and the temporary mandrel or filler 46 is of 6.3 MG molybdenum. MG denotes weight (representing in mg) of a wire having the length of 200 mm. The pitch of the overwind turns 48 is 0.08 mm.

Figure 5:
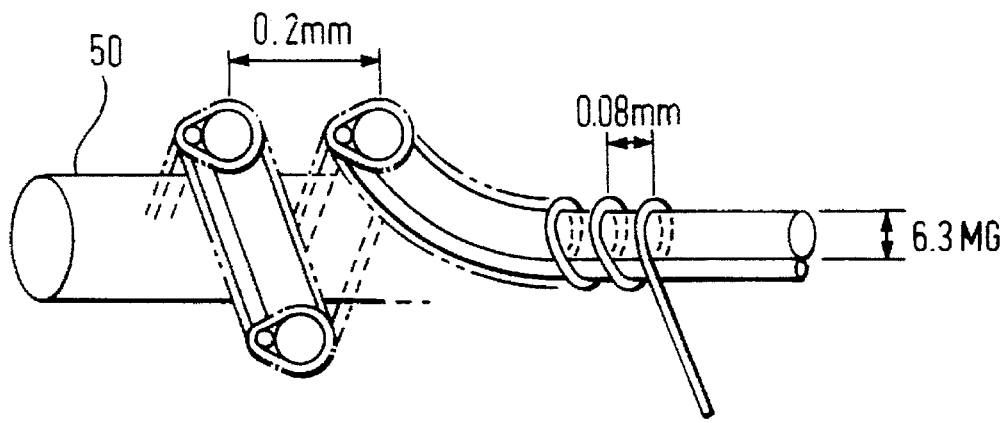

In the next step of coiling which is generally referred to as the secondary coiling, a single secondary mandrel 50 of 100 MG molybdenum is used. Around the secondary mandrel 50, the composite result of the primary coiling (consisting of the composite mandrel 44, 46 with the overwind 48 around it) is wound as shown in FIG. 5 wherein the pitch of the composite result is 0.2 mm.

After the step of the secondary coiling, another coiling referred as the triple coiling is performed. A piano wire (not shown) of 1.0 mm is used as a third mandrel (not shown). Around the third mandrel, another composite result at the secondary coiling step is wound with 0.7 mm pitch. Thereafter, the third mandrel or piano wire is removed from the congeries of coils. Then the congeries may be set by heat treatment, suitable to about 1500° C. in hydrogen. The filler material or temporary mandrel 46 and the secondary mandrel 50 may be dissolved out with the usual molybdenum solvent. This leaves a triple coiled coil. The triple coiled coil of 3 turns is mounted on the fluorescent lamp FL as the filament coils 14, 14 or electrodes. The cold resistance of the filament coil 14 is about 2.6 Ω at 25° C.

Figure 6:
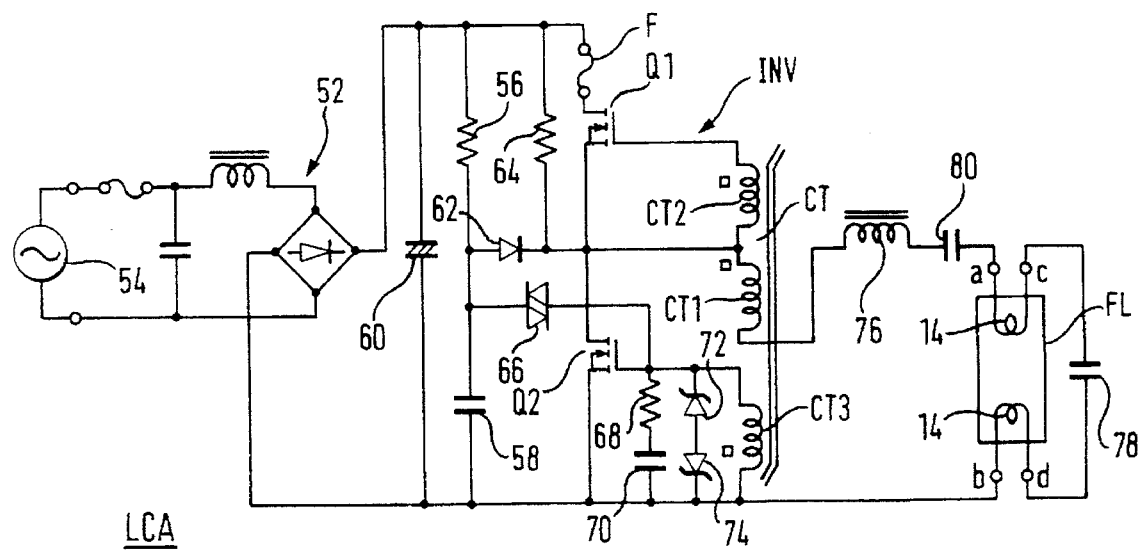
FIG. 6 is a circuit diagram of a lighting circuit arrangement of the lamp unit.

FIG. 6 is a circuit diagram of the lighting circuit arrangement LCA for the fluorescent lamp FL. The lighting circuit arrangement LCA includes an inverter circuit INV for supplying a high frequency power to the fluorescent lamp FL. A DC power supply circuit 52 rectifies and smooths an AC output of an AC supply source 54. A series circuit RC of a resistor 58 and a capacitor 58 is connected in parallel to a smooth capacitor 60 of the power supply circuit 52. A series circuit of a pair of first and second FETs (Field Effect Transistors) Q1, Q2 which operate as switching elements is connected in parallel to the series circuit RC. The common junctions of the series circuits RC and the FETs Q1, Q2 are connected to each other through a diode 62. Specifically, the anode of the diode 62 is connected to the source of the FET Q1 and the drain of the FET Q2 while the cathode of the diode 62 is connected to both the resistor 56 and capacitor 58. A resistor 64 is disposed between the drain and source of the FET Q1 through a fuse F.

A bidirectional switching element 66 which is a part of a trigger circuit including a resistor 68 and capacitor 70 is connected between the common junction of the series circuit RC and the gate of the FET Q2. A pair of inversely connected zener diodes 52, 74 is connected between the source and gate of the Q2. A saturated current transformer CT is provided in the inverter circuit INV, which has first, second and third windings CT1, CT2, CT3. The second and third windings CT2, CT3 are interposed between the gate and source of the FETs Q1 and Q2, respectively. A series resonant circuit composing of a choke coil 76 (0.64 mH)and a resonant capacitor 78 (123 μF) is included in the inverter circuit INV. The resonant capacitor 78 is to be connected to each one end of filament coils 14, 14 of the fluorescent lamp FL. Other one end of the filament coil 14 is connected to the choke coil 76 through a high pass filter 80 (333 μF). The first winding CT1, which is coupled to both the second and third windings CT2, CT3, is serially connected to the choke coil 56. Each of the filament coils has a cold resistance ranging from 2 Ω to 4 Ω, end when the fluorescent lamp FL is substituted by a resistor having 5 Ω, an output voltage of the inverter circuit INV exhibits more than 260 volts. The output voltage of the inverter circuit INV in this instance means the terminal voltage of the resistor or the capacitor 76 in parallel to the resistor.

Figure 7:
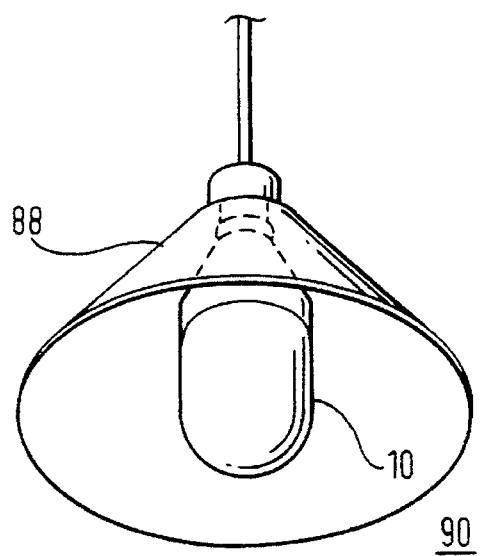
FIG. 7 is a perspective view of a lamp apparatus in which lamp unit shown in FIG. 1 is installed.

FIG. 7 shows a lamp apparatus 90 in which the fluorescent lamp unit 10 is installed in a lamp fixture 88.

The operation of the lighting circuit arrangement LCA is explained below.

When the AC supply source 54 supplies AC power, is rectified and smoothed in the DC power supply circuit 52. A DC current from the DC power supply circuit 52 passes through the resistor 56 to charge the capacitor 58. At the same time, a current passes through the first winding CT1 and the choke coil 76 into the filament coils 14, 14. When the voltage developed at the junction of the resistor 56 and the capacitor 58 exceeds a predetermined value, the bidirectional switching element 66 turns ON and a current passes through the resistor 68 to charge the capacitor 70, which results in causing FET Q2 to ON and a resonant circuit (including FET Q2, the first winding CT1, the choke coil 76, the resonant capacitor 78 and the filament coils 14, 14) is formed. A current passing through the first winding CT1 in the resonant circuit induces currents in the second and third windings CT2, CT3, respectively. As a result, the FET Q2 is turned OFF and the FET Q1 is turned ON. As a result another resonant circuit is formed, which includes the FET Q1, the first winding CT1, the choke coil 76, the resonance capacitor 78. This causes to flow a current through this resonant circuit in the direction reverse from the former resonant circuit, and as a result FET Q1 turns OFF and the FET Q2 turns ON. In response to ON/OFF operations of the FETs Q1, Q2, the inverter circuit INV oscillates to generate a high frequency output voltage. The high frequency voltage is applied between the filament coils 14,14 or electrodes to ignite the fluorescent lamp FL. An arc discharge is thus developed between the filament coils. In this instance, the lamp voltage exhibits about 40 V. After starting the fluorescent lamp FL, a current is still flows through the resonant capacitor 78 to heat the filament coils 14, 14 during the operation of the fluorescent lamp FL.

It is known that when the filament coils 14, 14 have lost the thermionic emission due to the dissipation of the emitter, the fluorescent lamp FL will no longer start and will hold in a glow discharge state that will quickly sputter away all the remaining filament structure including the filament coils 14, 14.

As clearly described with respect to the circuit arrangement described above, the filament coils 14, 14 are regarded as components of the resonant circuits, and when either one of the filament coils 14, 14 is cut off, the lamp operation is ceased because the resonant circuits are no longer formed in the inverter circuit INV. This prevents the generation of heat by the fluorescent lamp FL, specifically at the leg portions 12a, 12b. Therefore, the sleeves 28a, 28b and other members such as the adhesive 32, which are located adjacent thereto is prevented from abnormally raising the temperature at the life end of the fluorescent lamp FL.

In order to shorten the glow discharge state at the life end of the fluorescent lamp FL, it is effective to reduce resistance of the primary wire 48 of the filament coil 14 for delivering a higher voltage from the inverter circuit INV. However, the shorter the primary wire 48 of the filament coil 14 becomes short, the smaller the amount of emitter retained by the filament coil 14 becomes. A proper size of the diameter of the primary wire 48 must be used. If extremely small diameter is used, evaporation of the emitter is accelerated by abnormally raised arc-spot temperature. Contrary to this, if extremely large diameter is used, arc-spot is not stably formed and spattering of the emitter shortens the life of the fluorescent lamp FL.

Our experiments indicate that when the diameter of the primary wire 48 having more than 14 MG is used, it takes a long time to cut off the filament coils 14, 14 and heat radiated from the leg portions 12a, 12b damages the sleeves 28a, 28b and other members including the adhesive 32. When the diameter of the primary wire 48 having less than 6 MG is used, a high voltage for establishing a glow discharge necessary for starting the lamp is not obtained because of the high resistance of the filament coils 14, 14. This means that the fluorescent lamp FL is not ignited and is still in a preheating condition. Heat, which is generated by the glow discharge and is radiated and/or conducted from the leg portions 12a, 12b, damages the sleeves 28a, 28b and other members including the adhesive 32.

According to our experiments, a preferred range of the diameter or MG of the primary wire 48 of the filament coil 14 is 8 MG though 12 MG as illustrated in the TABLE.

TABLE

| MG | 6 | 8 | 10 | 12 | 14 |
| --- | --- | --- | --- | --- | --- |
| Mode | PH | DH | DS | DS | DS |
| Cut off time (minute) | NI | 1.5 | 4 | 6 | 9 |

PH: preheat
DS: discharge
NI: not ignited

If the diameter of the filament coil 14 of the fluorescent lamp FL is selected within the range mentioned above, the filament coil 14 is effectively cut off at the life end of the fluorescent lamp FL; and the sleeves 28a, 28b and other members such as the adhesive 32, which are disposed adjacent to the leg portions 12a, 12b of the bulb 12, are prevented from abnormally raising the temperature which may lead to fumming or fire for the worst case.

Various changes and modifications may be made, and any feature described herein may be used with any of the others, within the scope of the inventive concept.

What is claimed is:
1. A compact type fluorescent lamp unit comprising:
a phosphor coated bulb including:
first and second sealed end portions,
a pair of filament coils disposed in the first and second sealed end portions for producing an arc therebetween, the filament coils being substantially composed of a tungsten wire having a diameter corresponding to 8 MG through 12 MG and being normally operated with a lamp current ranging from 250 mA to 350 mA, and
a fill containing mercury and a rare gas, wherein the filament coils have two ends and contain an emitter for enhancing thermionic emission of electrons therefrom, said filament coils being cut off by self-generated heat when the emitter is substantially dissipated,
a lighting circuit arrangement for supplying electrical energy to the filament coils, the lighting circuit arrangement including an inverter circuit containing a resonant capacitor connected between each end of the filament coils, a resonant current being passed through the resonant capacitor during the operation of the lamp unit,
a housing providing an inner space within which the bulb and the lighting circuit arrangement are disposed; and
a support member disposed in the inner space for supporting the bulb, wherein the support member supports the first and second sealed end portions of the bulb.
2. A compact fluorescent lamp unit according to claim 1, wherein the filament coil has a cold resistance ranging from 2 Ω to 4 Ω and an output voltage of the inverter circuit exhibits more than 260 volts when the fluorescent lamp is substituted by a resistor having 5 Ω.
3. A compact fluorescent lamp unit comprising:
a phosphor coated bulb including:
first and second sealed end portions,
a pair of filament coils disposed in the first and second sealed end portions for producing an arc therebetween, the filament coils being substantially composed of a tungsten wire having a diameter corresponding to 8 MG through 12 MG and being normally operated with a lamp current ranging from 250 mA to 350 mA, and
a fill containing mercury and a rare gas, wherein the filament coils are cut off by self-generated heat when the emitter is substantially dissipated,
a lighting circuit arrangement for supplying electrical energy to the filament coils, the lighting circuit arrangement including an inverter circuit containing a resonant capacitor connected between each end of the filament coils, a resonant current being passed through the resonant capacitor during the operation of the lamp unit,
a housing providing an inner space within which the bulb and the lighting circuit arrangement are located; and
a partition member for dividing the inner space into first and second space portions, the partition member including a support member that is disposed in the inner space for supporting the bulb,
wherein the support member supports the first and second sealed end portions of the bulb, and
wherein the bulb is substantially contained in the first space portion and the lighting circuit arrangement is contained in the second space portion.

4. A compact fluorescent lamp unit according to claim 3, wherein the filament coil has a cold resistance ranging from 2 Ω to 4 Ω and an output voltage of the inverter circuit exhibits more than 260 volts when the fluorescent lamp is substituted by a resistor having 5 Ω.

5. A compact fluorescent lamp unit comprising:

a phosphor coated bulb including:

first and second sealed end portions, a pair of tungsten filament coils disposed in the first and second sealed end portions for producing an arc therebetween, the filament coils being substantially composed of a tungsten wire having a diameter corresponding to 8 MG through 12 MG and being normally operated with a lamp current ranging from 250 mA to 350 mA, and a fill containing mercury and a rare gas, wherein the filament coils have two ends and contain an emitter for enhancing thermionic emission of electrons therefrom, said filament coils being cut off by self-generated heat when the emitter is substantially dissipated, a lighting circuit arrangement for supplying electrical energy to the filament coils, the lighting circuit arrangement including an inverter circuit containing a resonant capacitor disposed between each end of the filament coils, a resonant current being passed through the resonant capacitor during the operation of the lamp unit, a plastic cover providing an inner space within which the bulb and the lighting circuit arrangement are located;

a partition member formed with a plastic material for dividing the inner space into first and second space portions, wherein the bulb is substantially contained in the first space portion and the lighting circuit arrangement is contained in the second space portion, the partition member including a support member for supporting the first and second end portions of the bulb.

6. A compact fluorescent lamp according to claim 5, wherein the filament coil has a cold resistance ranging from 2 Ω to 4 Ω and an output voltage of the inverter circuit exhibits more than 260 volts when the fluorescent lamp is substituted by a resistor having 5 Ω.

7. A lamp apparatus comprising:

a lamp fixture; and a compact fluorescent lamp unit, including:

a phosphor coated bulb including:

first and second sealed end portions, a pair of filament coils disposed in the first and second sealed end portions for producing an arc therebetween, the filament coils being substantially composed of a tungsten wire having a diameter corresponding to 8 MG through 12 MG and being normally operated with a lamp current ranging from 250 mA to 350 mA, and a fill containing mercury and a rare gas, wherein the filament coils have two ends and contain an emitter for enhancing thermionic emission of electrons therefrom, the filament coils being caused to cut off by the self-generated heat when the emitter is substantially dissipated, a lighting circuit arrangement for supplying electrical energy to the filament coils, the lighting circuit arrangement including an inverter circuit containing a resonant capacitor disposed between each end of the filament coils, a resonant current being passed through the capacitor during the operation of the lamp, a cover providing an inner space within which the bulb and the lighting circuit arrangement are located; and a support member disposed in the inner space for supporting the bulb, wherein the support member supports the first and second sealed end portions of the bulb.

8. A lamp apparatus according to claim 7, wherein the filament coil has a cold resistance ranging from 2 Ω to 4 Ω and an output voltage of the inverter circuit exhibits more than 260 volts when the fluorescent lamp is substituted by a resistor having 5 Ω.

* * * * *